United States Patent
Tran et al.

(10) Patent No.: US 8,984,254 B2
(45) Date of Patent: Mar. 17, 2015

(54) TECHNIQUES FOR UTILIZING TRANSLATION LOOKASIDE BUFFER ENTRY NUMBERS TO IMPROVE PROCESSOR PERFORMANCE

(71) Applicants: Thang M. Tran, Austin, TX (US); Edmund J. Gieske, Cedar Park, TX (US)

(72) Inventors: Thang M. Tran, Austin, TX (US); Edmund J. Gieske, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 270 days.

(21) Appl. No.: 13/630,346

(22) Filed: Sep. 28, 2012

(65) Prior Publication Data

US 2014/0095784 A1 Apr. 3, 2014

(51) Int. Cl.
 *G06F 12/10* (2006.01)
(52) U.S. Cl.
 CPC .................................. *G06F 12/1027* (2013.01)

USPC .... 711/207; 711/108; 711/133; 711/E12.001; 711/E12.07

(58) Field of Classification Search
None
See application file for complete search history.

(56) References Cited

U.S. PATENT DOCUMENTS

| 5,630,088 A * | 5/1997 | Gupta et al. ................... 711/207 |
| 6,662,280 B1 * | 12/2003 | Hughes .......................... 711/156 |
| 2009/0210679 A1 | 8/2009 | Tsai et al. ...................... 712/225 |
| 2013/0275715 A1 * | 10/2013 | Caprioli et al. ................ 711/203 |

* cited by examiner

*Primary Examiner* — Kevin Verbrugge
(74) *Attorney, Agent, or Firm* — Yudell Isidore PLLC (57) ABSTRACT

A technique for operating a processor includes translating, using an associated translation lookaside buffer, a first virtual address into a first physical address through a first entry number in the translation lookaside buffer. The technique also includes translating, using the translation lookaside buffer, a second virtual address into a second physical address through a second entry number in the translation lookaside buffer. The technique further includes, in response to the first entry number being the same as the second entry number, determining that the first and second virtual addresses point to the same physical address in memory and reference the same data.

21 Claims, 9 Drawing Sheets

TECHNIQUES FOR UTILIZING TRANSLATION LOOKASIDE BUFFER ENTRY NUMBERS TO IMPROVE PROCESSOR PERFORMANCE

BACKGROUND

1. Field

This disclosure relates generally to improving processor performance and, more specifically, to techniques for utilizing translation lookaside buffer entry numbers to improve processor performance.

2. Related Art

Content-addressable memory (CAM) is a special type of memory used in certain high-speed searching applications. Unlike random access memory (RAM), in which a memory address is supplied to a RAM and the RAM returns a data word stored at the address, a CAM is designed such that a memory address is supplied and the CAM searches its entire content to see if the supplied memory address is stored anywhere in the CAM. If the address is found, the CAM returns a data word stored at the address. Because a CAM is designed to search its entire memory in a single operation, it is usually more flexible than RAM. There are, however, cost disadvantages to CAM.

Unlike RAM, which has simple storage cells, each individual memory bit in a fully parallel CAM has its own associated comparison circuit to detect a match between stored bits and input bits. Additionally, match outputs from each cell in the address must be combined to yield a complete address match signal. The additional circuitry increases the physical size of the CAM chip which increases manufacturing cost. The extra CAM circuitry also increases power dissipation since every comparison circuit is active on every access. Consequently, CAM is usually only used in specialized applications where searching speed cannot be accomplished using a less costly method.

A translation lookaside buffer (TLB) may take the form of a cache memory (cache) that memory management hardware may use to improve virtual address translation speed. In general, processors use a TLB to map virtual addresses to physical addresses. A TLB may be implemented as a CAM. In this case, a TLB search key corresponds to a virtual address and the search result, when a TLB hit occurs, is a physical address. If the requested address is present in the TLB (referred to as a TLB hit), the CAM search yields a physical address that may be used to access memory. If the requested address is not in the TLB (referred to as a TLB miss), a process called a page walk may be initiated to determine the physical address. In a typical situation, after the physical address is determined by the page walk, the new virtual address to physical address mapping is entered into the TLB. In general, a TLB has a fixed number of slots that contain page table entries, which map virtual addresses to physical addresses.

A TLB may reside between a processor and cache, between a cache and main memory, between levels of a multi-level cache, or in another location within a processor (e.g., at an input of a store buffer). The TLB placement determines whether a cache uses physical or virtual addressing. If a cache is virtually addressed, requests are sent directly from the processor to the cache and the TLB is accessed only on a cache miss. If the cache is physically addressed, a TLB look-up is performed for every memory operation and the resulting physical address is sent to the cache. Physical addresses are used in both tag arrays for caches and store buffers.

Sequential consistency of out-of-order execution of load and store instructions in a software program requires physical address checking between load and store instructions for proper ordering of data. Increasing pipeline depth and the number of parallel dispatched instructions usually requires increasing a size of an associated store buffer. As memory space increases, address size increases and the number of comparators in a conventional load/store buffer also increases. Store-to-load data forwarding is often required for high-performance processor designs. In general, as memory space has increased, the time required for address comparison for store-to-load data forwarding has increased and associated power dissipation has increased. In most processor designs, store-to-load data forwarding has been a speed path, as the time for load virtual address translation to a load physical address (which is then compared to store physical addresses in a store buffer) increases with increasing memory space. As is known, when a load address matches a store address in a store buffer, data associated with the matched store address is forwarded from the store buffer to the load instruction.

In a Harvard architecture (or a hybrid thereof), a separate virtual address space or memory access hardware may exist for instructions and data. This can lead to distinct TLBs for each access type. A common optimization for physically addressed caches is to perform a TLB look-up in parallel with a cache access. Low-order bits of any virtual address (e.g., the lower 12 bits of the virtual address in a memory system having 4 kilobyte (kB) pages) represent the offset of the desired address within a page and, as such, do not change in the virtual-to-physical address translation. During a cache access, two steps are performed, i.e., an index is used to find a cache entry and the tags for the cache line are compared. If the cache is structured in such a way that the cache can be indexed using only the bits that do not change in translation, the cache can perform its "index" operation while the TLB translates the upper bits of the address. The translated address from the TLB is then passed to the cache. The cache then performs a tag comparison to determine if the access was a hit or miss.

Cache entries usually include a data block, a tag, and flag bits. The data block includes the data fetched from main memory and the tag includes a portion of the address of the data fetched from the main memory. An instruction cache requires only one flag bit (i.e., a valid bit) per cache row entry. The valid bit indicates whether or not a cache block has been loaded with valid data. A data cache typically requires at least two flag bits (i.e., a valid bit and a dirty bit) per cache row entry. The dirty bit indicates whether the cache block is unchanged since it was read from main memory (i.e., whether the cache block is "clean") or whether the processor has written data to that block and the new value has not yet made it all the way to main memory (i.e., whether any data in the cache block has been marked since it was fetched from main memory or is "dirty").

An implemented replacement policy dictates where in a cache a copy of a particular entry of main memory is stored. If the replacement policy is free to choose any entry in the cache to hold the copy, the cache is a fully-associative cache. At the other extreme, if each entry in main memory can be stored in just one location in a cache, the cache is a direct mapped cache. Many caches implement a compromise in which each entry in main memory can go to any one of 'N' places in the cache (referred to as an N-way set associative). In general, associativity is a trade-off. For example, if there are four places to which a replacement policy could have mapped a memory location, then to check if that location is in the cache four cache entries must be searched. It should be appreciated that checking more cache locations usually requires more power, chip area, and time. On the other hand, caches with more associativity suffer fewer misses, so that a processor wastes less time reading from main memory.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

Assuming a 40-bit physical address is maintained in a store buffer and a 4 kB page size is employed, a 12-bit index (which is the same for physical and virtual addresses as the index designates a location within a page) and a 28-bit physical address (which is translated by a translation lookaside buffer (TLB) from a virtual address) are required for the 40-bit physical address. As the 12-bit index is not in a speed path, the 12-bit index can be compared directly from the virtual address (i.e., the 12-bit index does not require translation). According to one or more embodiments, instead of maintaining a 28-bit physical address in a store buffer, a 2-bit TLB way and a 4-bit TLB index (based on a virtual address) are maintained for a 64-entry TLB. It should be appreciated that comparison of two bits (i.e., the 2-bit TLB way) is usually faster than the comparison of twenty-eight bits. For page sizes larger than 4 kB, more index bits can be maintained in the store/load buffer. It should be appreciated that reducing the number of bits compared may eliminate the speed path associated with a store buffer CAM and generally reduces power consumption of the store buffer. While the discussion herein focuses on a 40-bit physical address, it should be appreciated that the techniques disclosed herein are applicable to physical addresses larger or smaller that forty bits.

As is known, a store buffer TLB is employed to look-up a physical address for store instructions and load instructions. If the physical addresses are the same, then both load and store instructions should hit a same entry in the TLB. According to one or more embodiments, a store buffer is configured to maintain TLB entries (i.e., TLB indices and TLB ways) instead of physical addresses. For a 64-entry and 4-way TLB, a TLB entry is identified by a 4-bit TLB entry (for designating one of 16 entries) and a 2-bit TLB way (for designating one of four ways). In this example, each store buffer entry includes a 16-bit virtual address (i.e., a 12-bit index and the 4-bit TLB entry) that can be compared in a first execution stage and a 2-bit TLB way that can be compared following a TLB hit in the first execution stage. When TLB entries are employed instead of physical addresses for store-to-load data forwarding, problems may occur due to aliasing and when a TLB entry is being replaced following a TLB miss.

The TLB can use a least-recently used (LRU) replacement algorithm, which means that the TLB entries in the store buffer are recently used in the TLB. In the extremely rare case of a TLB miss to the same 16-bit virtual address in the store buffer (i.e., the replacement way matches with multiple entries in the store buffer), the store buffer may be drained to the TLB miss instruction. To address aliasing (i.e., when two virtual addresses in a TLB are associated with a same physical address), physical addresses may be compared for aliasing as an entry is written into the TLB. When aliasing occurs, an older entry may be invalidated or an aliasing indication may be set in the store buffer and the TLB.

Maintaining only the virtual address index and the TLB way in the store buffer reduces the number of bits that need to be compared (e.g., reduces the number of bits from a 40-bit physical address to a 16-bit virtual address (4-bit TLB index plus the 12-bit index address) and a 2-bit TLB way. This facilitates address comparison for store-to-load data forwarding in a first execution stage for the 16-bit virtual address, as contrasted with a second execution stage. It should be appreciated that a similar approach (as disclosed for a store buffer) may be employed in a load buffer. In general, employing a TLB index and way instead of a physical address in a store buffer reduces the size of an associated CAM and also reduces speed path issues associated with the store buffer.

According to one or more aspects of the present disclosure, a technique for operating a processor includes translating, using an associated translation lookaside buffer, a first virtual address into a first physical address through a first entry number in the translation lookaside buffer. The technique also includes translating, using the translation lookaside buffer, a second virtual address into a second physical address through a second entry number in the translation lookaside buffer. The technique further includes, in response to the first entry number being the same as the second entry number, determining that the first and second virtual addresses point to the same physical address in memory and reference the same data.

Figure 1:
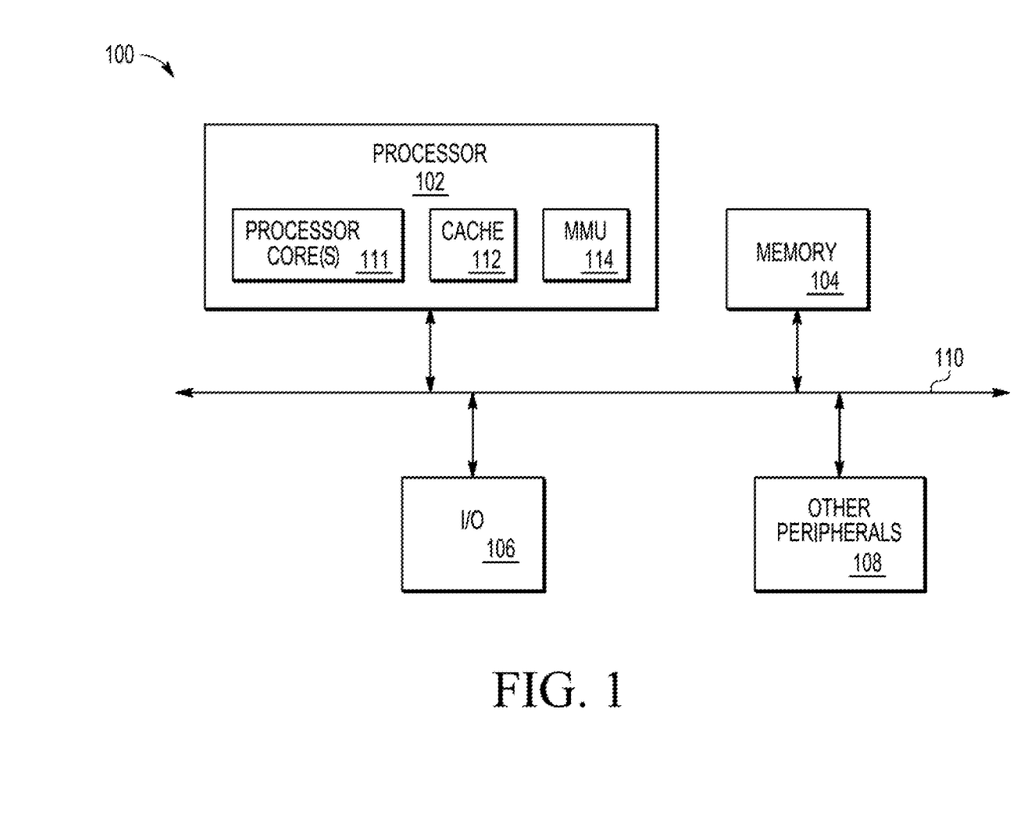
FIG. 1 is a block diagram of a relevant portion of a data processing system configured according to one embodiment of the present invention.

With reference to FIG. 1, an exemplary data processing system 100 includes a processor 102, a memory 104, an input/output port 106, and other peripherals 108, each coupled to a bus 110. The processor 102 includes one or more processor cores 111, a cache 112, and a memory management unit (MMU) 114 for managing memory 104. The memory 104 includes an application appropriate amount of volatile memory (e.g., dynamic random access memory (DRAM) and/or static RAM (SRAM)) and non-volatile memory (e.g., flash and/or read-only memory (ROM)). It should be appreciated that a data processing system configured according to the present disclosure may have various different configurations.

Figure 2:
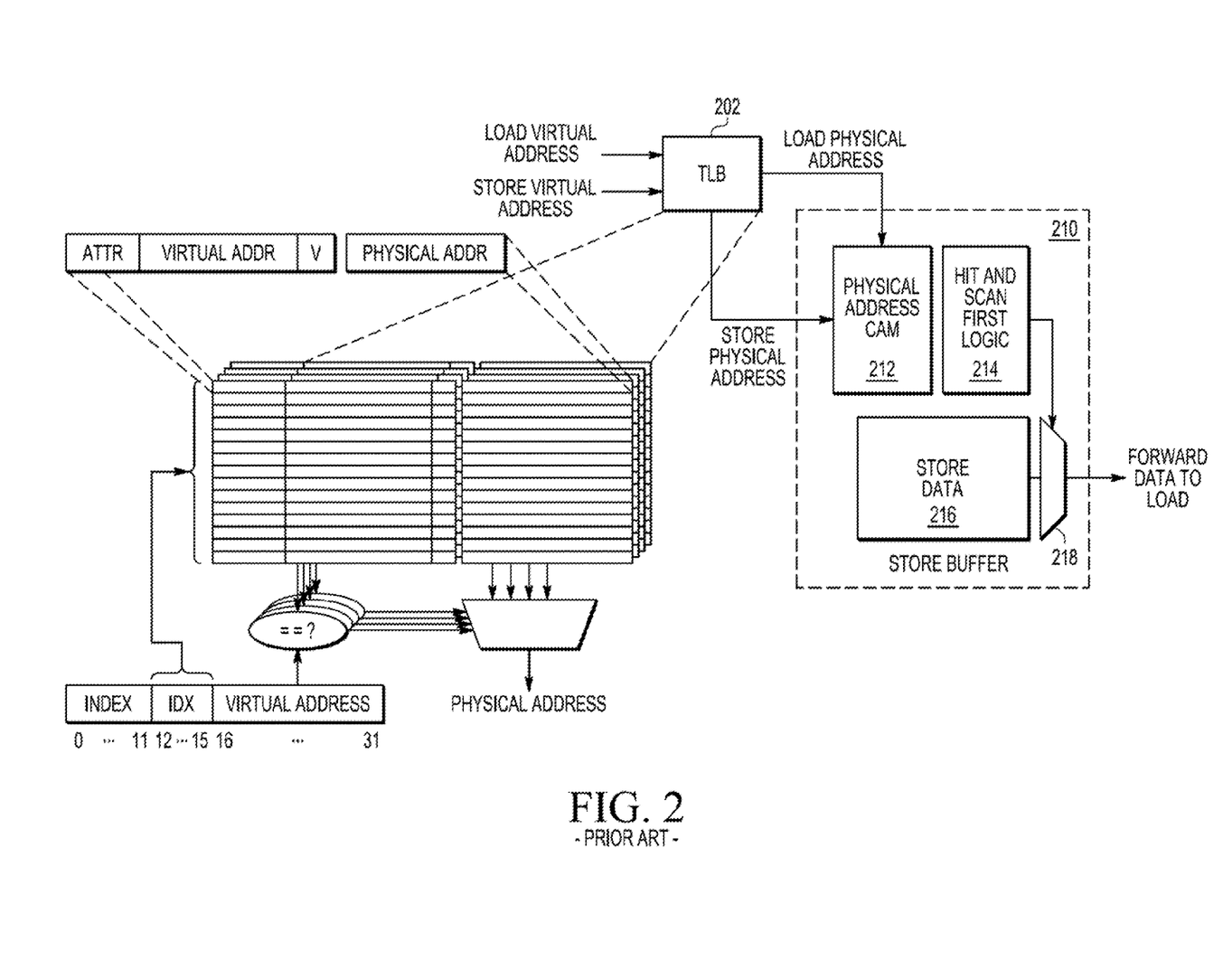
FIG. 2 is a diagram of a relevant portion of a conventional store buffer and an associated translation lookaside buffer (TLB).

With reference to FIG. 2 a relevant portion of a conventional store buffer 210 and an associated translation lookaside buffer (TLB) 202 are illustrated. As is illustrated in the expanded view of the TLB 202, the TLB is 4-way set associative, with each way including sixteen entries. As shown, each entry includes an attribute field (labeled "ATTR"), a virtual address field (labeled "VIRTUAL ADDR"), a valid bit field (labeled "V"), and a physical address field (labeled "PHYSICAL ADDR"). Based on whether a load virtual address and/or a store virtual address is received at load/store inputs of the TLB 202, the TLB 202 is configured to generate a load physical address and/or a store physical address on load/store outputs of the TLB 202 on a TLB hit. As is illustrated in FIG. 2, the load physical address from the TLB 202 is provided to a first input of physical address CAM 212 of the store buffer 210. Similarly, the store physical address from the TLB 202 is provided to a second input of the CAM 212 of the store buffer 210.

Figure 3:
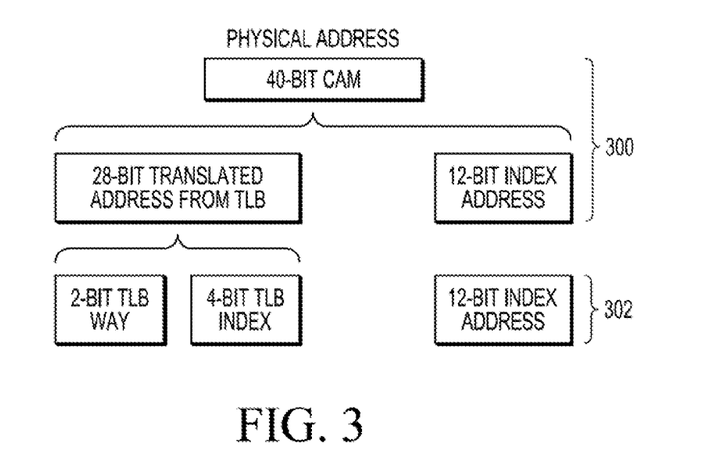
FIG. 3 is a diagram that contrasts bits employed by a conventional content accessible memory (CAM) of the conventional store buffer of FIG. 2 with bits employed by a CAM of a store buffer configured according to an embodiment of the present invention.

With reference to FIGS. 2 and 3, the CAM 212 is a 40-bit CAM 300 that compares a 28-bit translated address from the TLB 202 and a 12-bit index address from the TLB 202 to determine if the CAM 212 includes store instruction data (in store data 216) that can be forwarded to a load instruction. The store buffer 210 also includes hit and scan first logic (HSFL) 214 that is configured to ensure that the most recent store instruction data (in the event there are multiple store instruction data for a same physical address in the store data 216) is selected by multiplexer 218 for forwarding to the load instruction.

Figure 4:
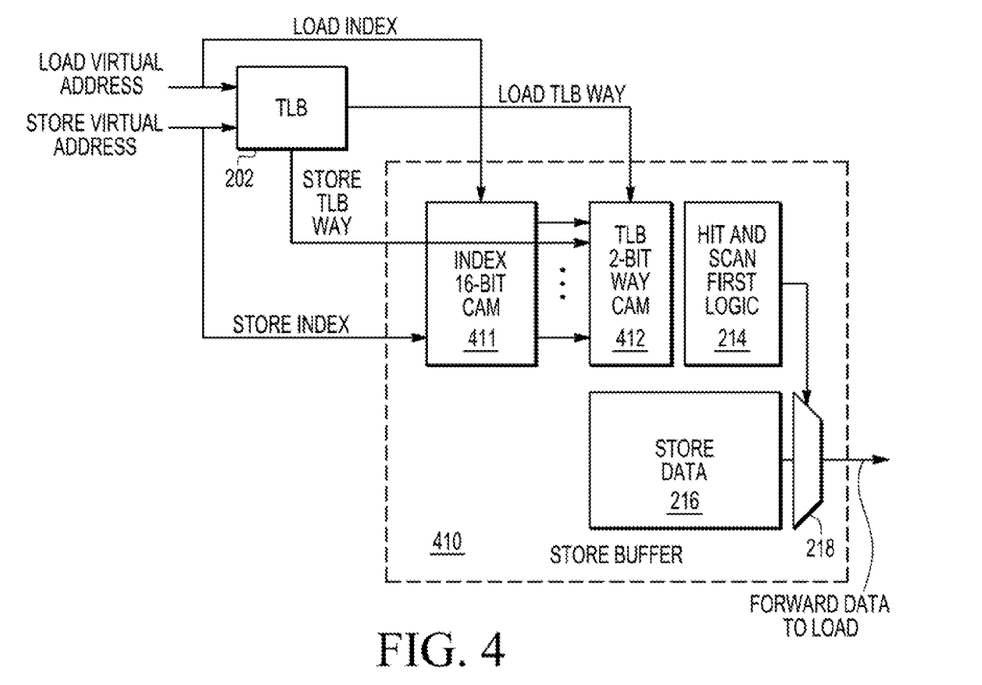
FIG. 4 is a diagram of a relevant portion of a store buffer and an associated TLB configured according to an embodiment of the present invention.

With reference to FIG. 4 a relevant portion of a store buffer 410 and an associated TLB 202, which are configured according to an embodiment of the present disclosure, are illustrated. The TLB 202 sends way hit information to TLB way CAM (labeled "TLB 2-bit Way CAM") 412. Index CAM (labeled "Index 16-bit CAM) 411 recovers the index directly from the store and load virtual addresses. If the CAM 411 and the CAM 412 both indicate hits for a load instruction, then the store buffer 410 has store data to forward to the load instruction. The store buffer 410 also includes hit and scan first logic (HSFL) 214 that is configured to ensure that the most recent store instruction data (in the event there are multiple store instruction data for a same index and way in the store data 216) is selected by multiplexer 218 for forwarding to the load instruction.

With reference again to FIG. 3, according to the present disclosure, the 16-bit index is derived from the 4-bit TLB index and the 12-bit index address (for a 4 kB page) and corresponds to the virtual address 302, which is used in conjunction with the 2-bit TLB way in determining whether a hit for a load instruction has occurred (as contrasted with using the 40-bit physical address 300). As noted above, comparing fewer bits in a store buffer to determine whether a match occurs (i.e., whether store data maintained by a store buffer corresponds to data required by a load instruction, such that the store data can be forwarded to the load instruction) reduces the time required for comparison, as well as reducing power consumption and chip area.

Figure 5:
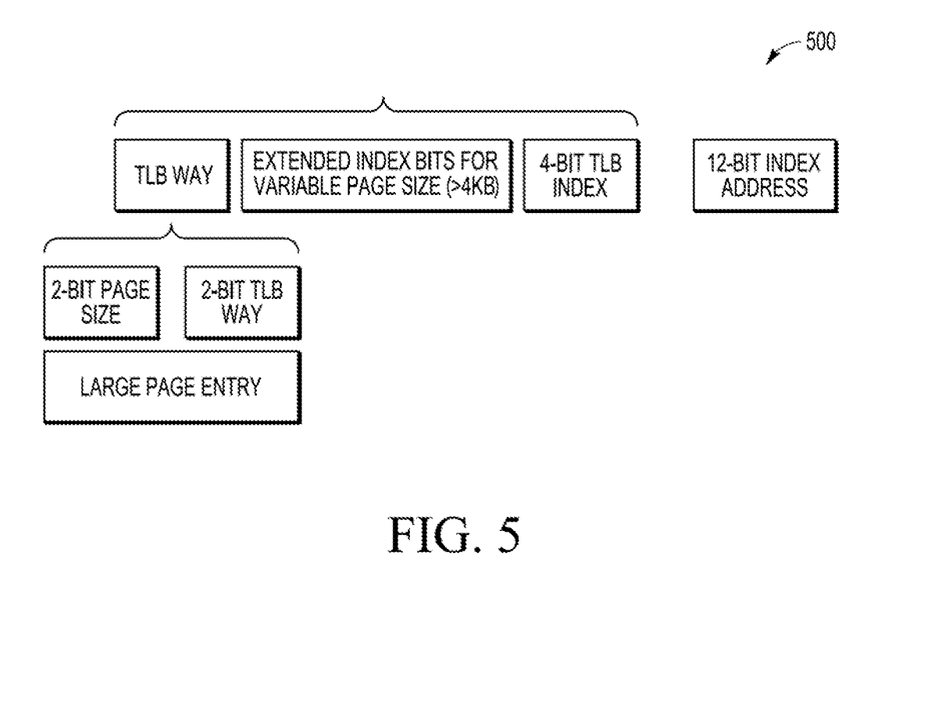
FIG. 5 is a diagram that contrasts bits employed by a CAM of a store buffer configured according to an embodiment of the present invention for different page sizes.

With reference to FIG. 5, diagram 500 illustrates that the number of index bits may be extended when variable page sizes are employed. For example, a 2-bit index for indicating page size may be employed. As one example, an index value of '00' may correspond to a 4 kB page size, a value of '01' may correspond to a 8 kB page size, a value of '10' may correspond to a 16 kB page size, and a value of '11' may correspond to a 32 kB page size. For larger page sizes (i.e., pages larger that 32 kB), a page size may be broken into smaller pages that are maintained in a TLB or the process may be serialized when a larger page size is encountered.

Figure 6:
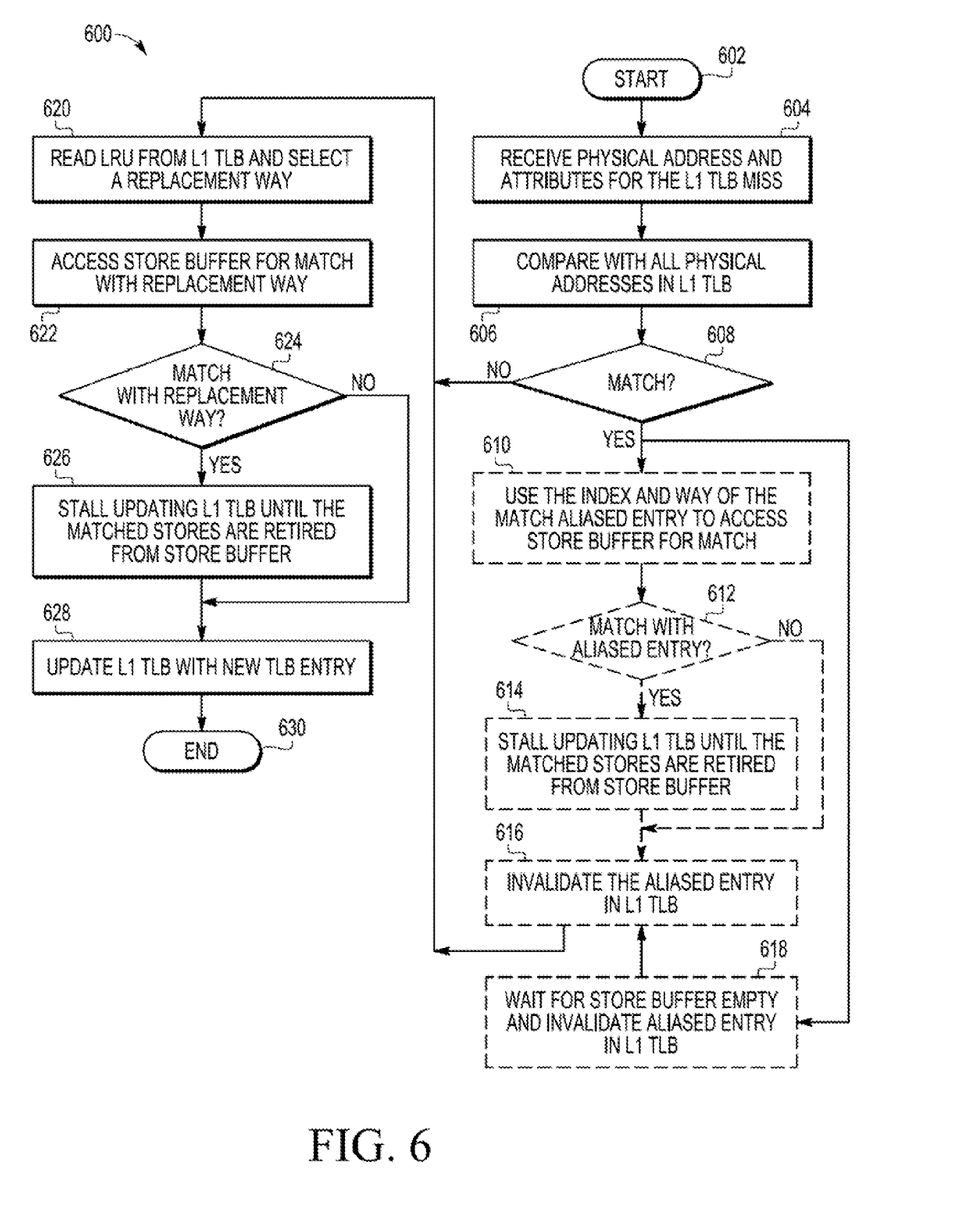
FIG. 6 depicts a flowchart of an exemplary process for TLB replacement for the TLB of FIG. 4 that addresses aliasing according an embodiment of the present invention.

With reference to FIG. 6 an exemplary process for level 1 (L1) TLB replacement that includes a process for addressing aliasing (i.e., when two or more virtual addresses map to a same physical address in an L1 TLB) following an L1 TLB miss, according an embodiment of the present invention, is illustrated. Process 600 is initiated at block 602 following a miss by the L1 TLB of a load or store instruction. Next, in block 604, the TLB receives the physical address and attributes for the L1 TLB miss from a level 2 (L2) TLB (not specifically shown). Then, in block 606, an L1 cache controller (e.g., included in cache 112 of processor 102 of FIG. 1) compares the received physical address with all physical addresses in the L1 TLB to determine if there is any aliased physical address currently in the L1 TLB.

Next, in decision block 608, the L1 cache controller determines if the received physical address matches with any of the physical addresses in the L1 TLB. In response to a match in block 608, control may transfer to block 618 (where a lower performance approach is implemented) or alternatively to block 610 (where a higher performance approach is implemented). In block 618, the L1 cache controller waits for the store buffer to empty before invalidating the aliased entry in the L1 TLB in block 616 and proceeding to block 620. In block 610, the L1 cache controller uses the index and way of the matched aliased entry to access the store buffer for a match. Next, in decision block 612, the L1 cache controller determines whether the aliased entry matches the entry in the store buffer. If a match occurs in block 612, control transfers to block 614 where the L1 cache controller stalls updating the TLB until the matched stores (i.e., stores with the same physical address as that associated with the TLB miss) are retired from the store buffer.

Next, control transfers to block 616, where the L1 cache controller invalidates the aliased entry in the L1 TLB. If a match does not occur in block 612, control transfers directly from block 612 to block 616 (where the aliased entry in the L1 TLB is invalidated) and then to block 620. In block 620 the L1 cache controller reads the LRU entry from the L1 TLB and selects a replacement way. Next, in block 622, the L1 cache controller accesses the store buffer for a match with the replacement way (which is unlikely to occur as the replacement way is usually LRU). Then, in decision block 624, the L1 cache controller determines whether a match with the replacement way occurred in the store buffer. If a match occurred in block 624, control transfers to block 626 where the L1 cache controller stalls updating the L1 TLB until the matched stores are retired from the store buffer. Next, in block 628, the L1 cache controller updates the L1 TLB with the new L1 TLB entry. If a match does not occur in block 624 control transfers directly to block 628. Following block 628 control transfers to block 630, where the process 600 ends until a next L1 TLB miss.

According to another aspect of the present disclosure, the techniques disclosed above with respect to an L1 TLB associated with a store buffer are extended to an L1 TLB associated with a data cache. In general, the timing of L1 data cache load instruction accesses are critical to processor performance. As such, processor designers usually spend a relatively large amount of time to ensure that load instruction latency is maintained below a desired number of processor cycles (e.g., three or fewer cycles). Hashed tag arrays have been employed to reduce processor speed paths. For example, in approaches employing hashed tag arrays, a physical address has been hashed into four to five bits to speed up tag address comparison. However, when the hashed tag array approach is utilized, a full tag array must generally be accessed to verify that the hashed tag array hit is valid. In general, the hashed tag array approach may require multiple replays (with associated increased power consumption).

Data cache access is often the most critical speed path in any processor design, as a data cache access includes accessing a TLB for a physical address, comparing the physical address to a tag array value, reading hit data from a data array of the data cache, and forwarding the read data to an execution unit. According to one or more embodiments of the present disclosure, techniques are implemented to reduce the delay related to comparison of a physical address to a tag array value. In general, to ensure high performance, hit signals from a tag array should be provided as fast as possible to gate sense-amplifiers of a data cache array.

According to aspects of the present disclosure, instead of using a 28-bit physical address from a tag array, a TLB entry number is employed. For example, if a first load instruction translates to TLB entry number 5 and a second load instruction translates to TLB entry number 5, then both load instructions should have the same physical address. In one embodiment, for a 64-entry TLB, six bits of the TLB entry are utilized for comparison instead of twenty-eight bits for the physical address. In a typical implementation, an L1 cache may include two TLB tag arrays (one for load instruction accesses and one for store instruction accesses) and one physical address tag array for snooping.

In one or more embodiments, the number of bits in a tag array is reduced from twenty-eight bits to six bits (four bits for one of sixteen TLB entries and two bits for one of four TLB ways). Using this approach, cache access time usually improves and speed paths in the data cache may be eliminated. In the various disclosed embodiments, power consumption is reduced and timing is improved. To handle certain issues, such as TLB entry replacement, aliasing, and large TLB page sizes, various alternative techniques may be employed. For example, TLB entry replacement issues may be addressed by flash invalidating all replaced TLB entries in a CAM of a TLB tag array. When a miss in a TLB tag array occurs, the full physical address tag array may be used to check for aliasing. If a match occurs, then there is aliasing and the TLB tag entry may be modified to a current TLB entry. Another option is to invalidate the aliased TLB entry in the TLB and TLB tag array. Large TLB page sizes (e.g., page sizes greater than 4 kB) can be addressed by adding additional index bits in the TLB tag array. In one embodiment, for page sizes larger than 32 kB, an access can go directly to the physical address tag array.

Maintaining a 6-bit effective address index (i.e., four bits to identify one of sixteen TLB entries and two bits to identify one of four TLB ways) in a tag array, as contrasted with a 28-bit physical address, allows effective address comparison for the tag array to be performed faster and more efficiently, as a 6-bit compare is usually faster and requires less power than a 28-bit compare. On TLB replacement, the replaced TLB entry is compared to all tag entries and all matches are invalidated. In one or more embodiments, the 4-bit TLB index is compared in a first execution stage, and a large page index and TLB way are compared following TLB access. When a miss occurs in the TLB tag array, the physical address tag array must be checked for aliasing. The TLB tag array is then updated with the new TLB entry.

Figure 7:
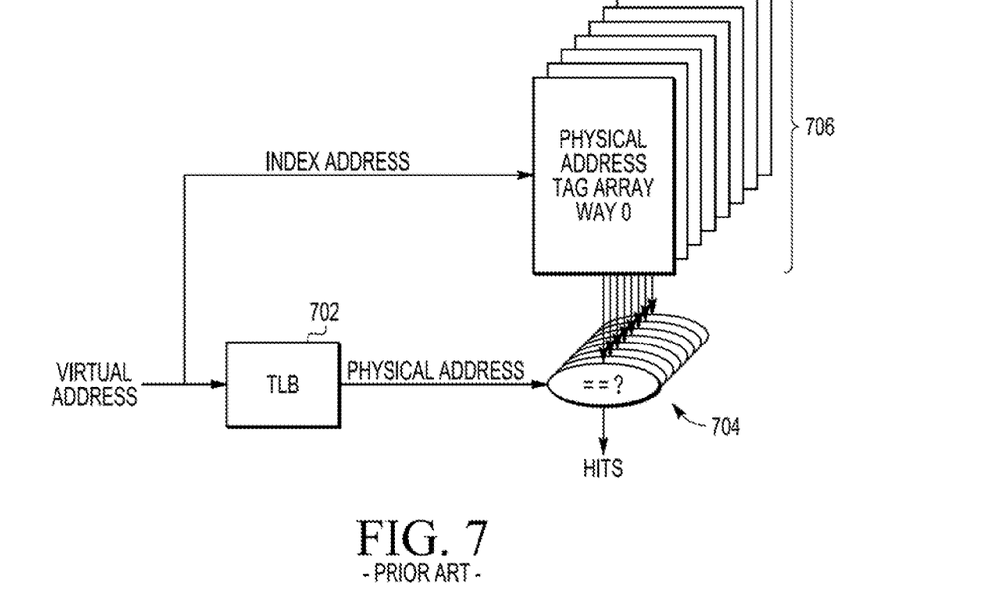
FIG. 7 is a diagram of a relevant portion of a conventional physical address tag array for a data cache and an associated translation lookaside buffer (TLB).

With reference to FIG. 7 a tag array of a conventional data cache and an associated translation lookaside buffer (TLB) are illustrated. A conventional data cache access includes accessing a TLB 702 for a physical address and comparing (using comparators 704) the physical address provided by the TLB 702 to tag array values provided by ways (in FIG. 7 eight ways are depicted) of a physical address tag array 706. As noted above, the index address (i.e., lower address bits) are the same for the virtual and physical address. As such, the index address is provided directly to the physical address tag array 706.

Figure 8:
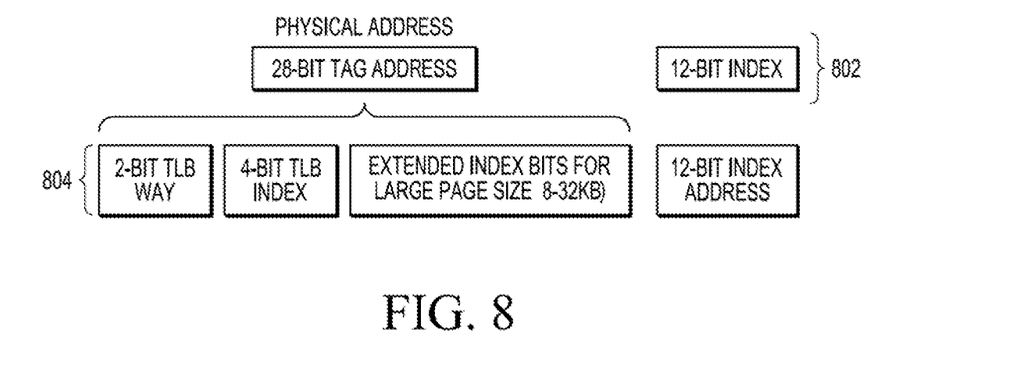
FIG. 8 is a diagram that contrasts bits employed by a conventional tag array entry for a data cache with bits employed by tag array entry of a data cache configured according to an embodiment of the present invention.

With reference to FIG. 8, a conventional tag address 802 provided by a TLB to a tag array of a data cache for comparison includes a physical address with twenty-eight bits and an index with twelve bits. According to aspects of the present disclosure, the twenty-eight bit physical address is replaced with an index 804 that includes a 2-bit TLB way, a 4-bit TLB index, and may include an additional 2-bit index for larger page sizes (e.g., 8 kB, 16 kB, and 32 kB page sizes). As previously noted, the lower address bits correspond to a 12-bit index (for 4 kB pages) and a 4-bit TLB index (for a sixteen entry TLB), which are the same for both virtual and physical addresses.

Figure 9:
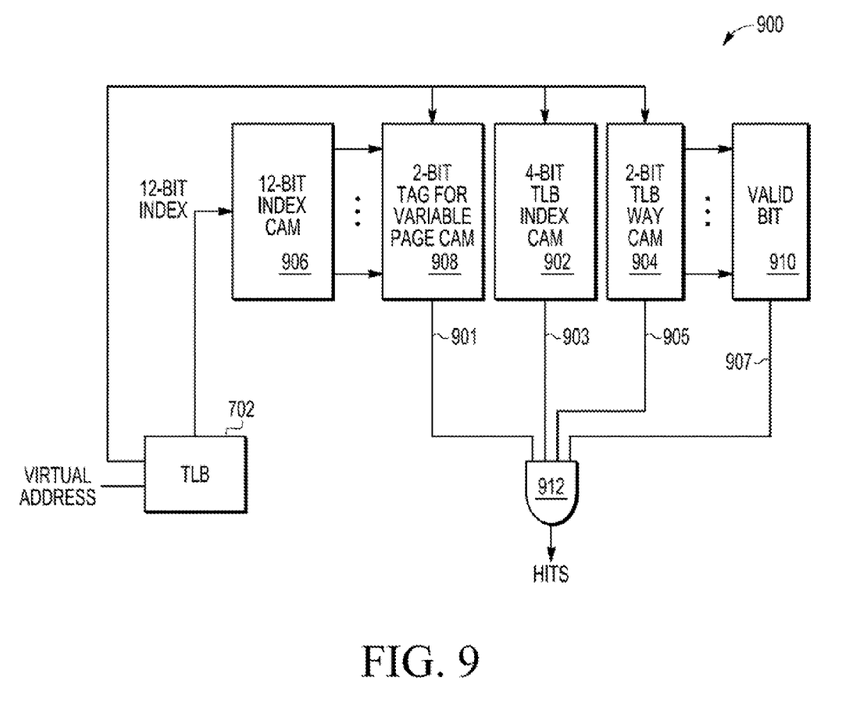
FIG. 9 is a diagram that depicts a relevant portion of a tag array and associated TLB for a data cache configured according to an embodiment of the present invention.

With reference to FIG. 9 a relevant portion of a tag array 900 (for a data cache) and associated TLB 702, that are configured according to an embodiment of the present disclosure, are illustrated. The TLB 702 receives a virtual address and provides respective inputs to 12-bit index CAM 906, 2-bit tag for variable page CAM 908 (if implemented), 4-bit TLB index CAM 902, and TLB 2-bit way CAM 904. A valid bit checking block 910 checks a valid bit of the tag array entry. Outputs 901, 903, 905, and 907, from the variable page CAM 908, the TLB index CAM 902, the TLB way CAM 904, and a valid bit checking block 910, respectively, are provided to different inputs of AND gate 912. When an output of the AND gate 912 is asserted, a tag hit is indicated. It should be appreciated that a processor may also implement a conventional physical address tag array for translation of variable page sizes or snooping.

Figure 10:
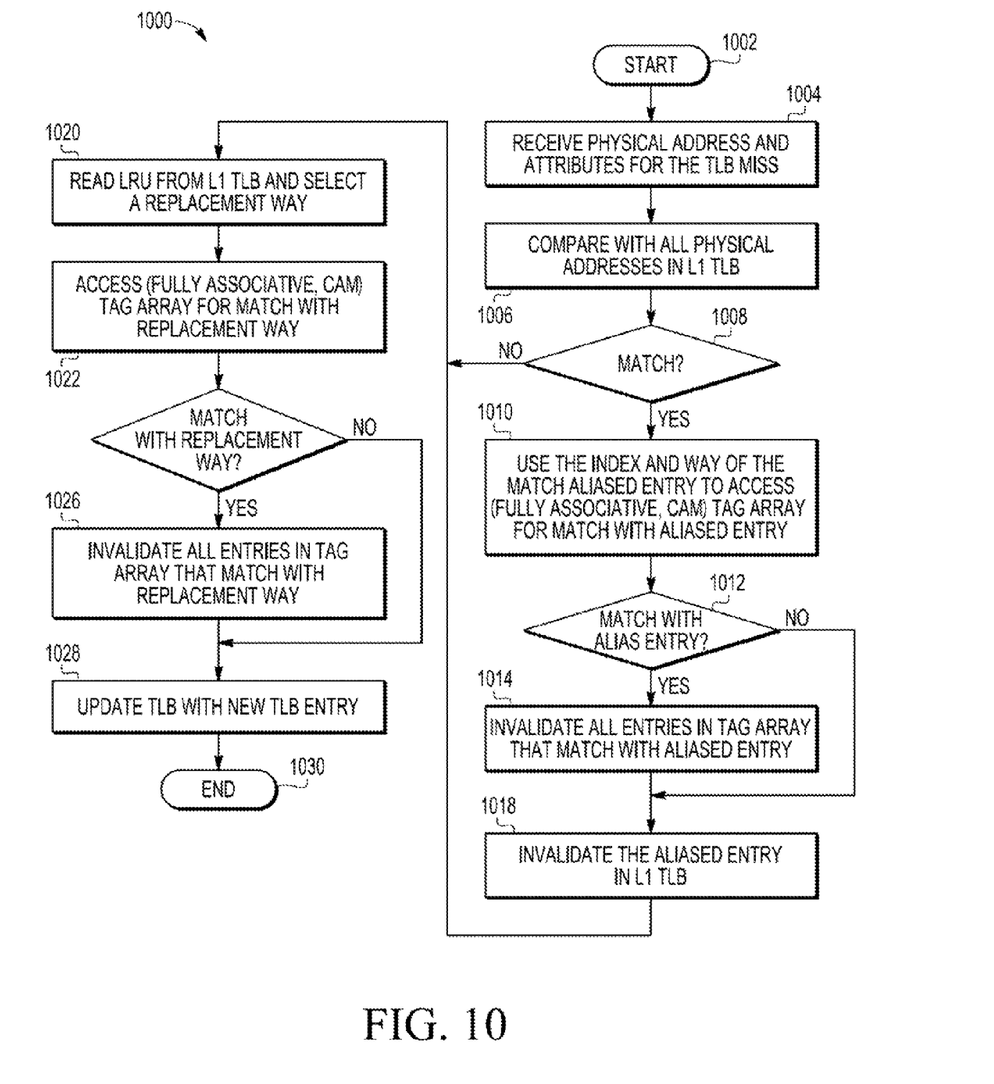
FIG. 10 depicts a flowchart of an exemplary process for TLB replacement for the TLB of FIG. 9 that addresses aliasing according to an embodiment of the present invention.

With reference to FIG. 10 an exemplary process 1000 for L1 TLB replacement that includes a process for addressing aliasing in the L1 TLB 702 of FIG. 9, according to an embodiment of the present disclosure, is illustrated. Process 1000 is initiated (by an L1 cache controller, e.g., located in cache 112 of FIG. 1) at block 1002 following a miss by an L1 TLB of a load or store instruction. Next, in block 1004, the L1 TLB receives the physical address and attributes for the L1 TLB miss from an L2 TLB (not separately shown). Then, in block 1006, the L1 cache controller compares the received physical address with all physical addresses in the L1 TLB.

Next, in decision block 1008, the L1 cache controller determines if the received physical address matches with any of the physical addresses in the L1 TLB. In response to a match in block 1008, control may transfer to block 1018 (where aliasing is later handled by a physical address tag array illustrated by the process of FIG. 11) or alternatively to block 1010 (where aliasing is not allowed in the data cache). In block 1018, the L1 cache controller invalidates the aliased entry in the L1 TLB before proceeding to block 1020. In block 1010, the L1 cache controller uses the index and way of the matched aliased entry to access the L1 tag array (which may be a fully associative CAM) for a match with the aliased entry. Next, in block 1012, the L1 cache controller determines whether the aliased entry matches the entry in the L1 tag array. If a match occurs in block 1012, control transfers to block 1014 where the L1 cache controller invalidates all entries in the L1 tag array that match with the aliased entry (i.e., entries with the same physical address as that associated with the L1 TLB miss).

Next, control transfers to block 1018. If a match does not occur in block 1012, control transfers directly from block 1012 to block 1018 where the aliased entry in the L1 TLB is invalidated. Following block 1018 control transfers to block 1020, where the L1 cache controller reads the LRU entry from the L1 TLB and selects a replacement way. Next, in block 1022, the L1 cache controller accesses the tag array for a match with the replacement way. Then, in decision block 1024, the L1 cache controller determines whether a match with the replacement way occurred. If a match occurred in block 1024, control transfers to block 1026 where the L1 cache controller invalidates all entries in the tag array that match with the replacement way. Next, in block 1028, the L1 cache controller updates the TLB with the new TLB entry. If a match does not occur in block 1024 control transfers to block 1028. Following block 1028 control transfers to block 1030 where the process 1000 ends until a next L1 TLB miss.

Figure 11:
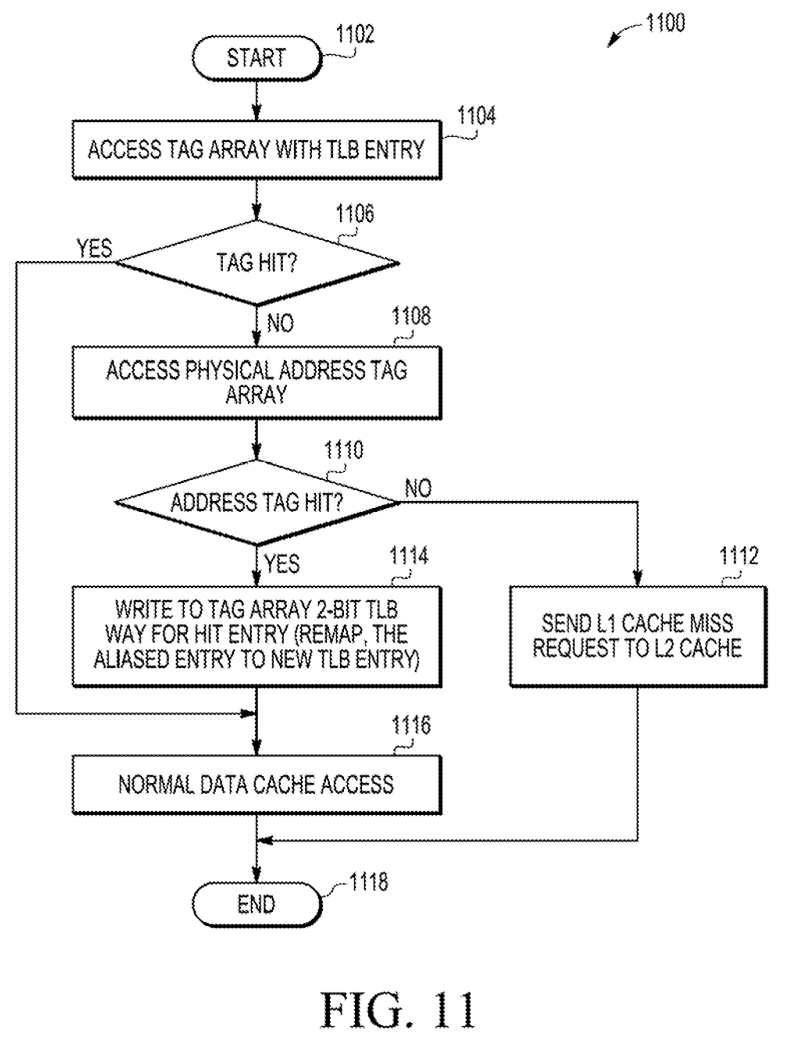
FIG. 11 depicts a flowchart of an exemplary process for accessing a tag array using a TLB entry according to an embodiment of the present invention.

With reference to FIG. 11, an exemplary process 1100 for accessing a tag array using a TLB entry according to an embodiment of the present disclosure, is illustrated. At block 1102 the process 1100 is initiated (e.g., in response to execution of a load or store instruction). Next, in block 1104 the L1 cache controller access the tag array with the TLB entry. Then, in decision block 1106, the L1 cache controller determines whether a tag hit occurred. If a tag hit occurred in block 1106, control transfers to block 1116 where a normal data cache access is initiated by the L1 cache controller. If a tag hit does not occur in block 1106, control transfers to block 1108 where the L1 cache controller accesses the physical address tag array.

Next, in decision block 1110, the L1 cache controller determines whether an address hit occurred in the physical address tag array. When an address hit does not occur in block 1110, control transfers to block 1112 where the L1 cache controller sends an L1 cache miss request to the L2 cache. Following block 1112 control transfers to block 1118, where the process 1100 terminates until execution of a next load or store instruction. When an address hit occurs in block 1110, control transfers to block 1114, where the L1 cache controller writes the 2-bit TLB way for the hit TLB entry to the tag array and remaps the aliased entry to a new TLB entry. Next, in block 1116 the L1 cache controller performs a normal data cache access. Following block 1116 control transfers to block 1118.

Accordingly, techniques have been disclosed herein that utilize a translation lookaside buffer entry (index and way) to reduce the power consumption and the time required to compare physical addresses in a processor to determine whether a storage hit (e.g., a store buffer hit or a data cache hit) has occurred.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a processor, comprising:

translating, using an associated translation lookaside buffer, a first virtual address into a first physical address through a first entry number, associated with a first multi-bit translation lookaside buffer way and a first multi-bit translation lookaside buffer index, in the translation lookaside buffer;

translating, using the translation lookaside buffer, a second virtual address into a second physical address through a second entry number, associated with a second multi-bit translation lookaside buffer way and a second multi-bit translation lookaside buffer index, in the translation lookaside buffer; and determining that the first and second virtual addresses point to a same physical address in memory and reference same data by determining the first multi-bit translation lookaside buffer way is equal to the second multi-bit translation lookaside buffer way and the first multi-bit translation lookaside buffer index is equal to the second multi-bit translation lookaside buffer index.

2. The method of claim 1, wherein the first entry number is associated with a first address in a first content-addressable memory that is included in a store buffer and the second virtual address is associated with a load operation, and wherein store data in the store buffer is forwarded to the load operation, and where the first and second entry numbers are associated with at least a 2-bit translation lookaside buffer way and at least a 4-bit translation lookaside buffer index.

3. The method of claim 1, wherein the first entry number is associated with a first address that is included in a first tag array of a cache and the second virtual address is associated with a load operation, and wherein store data in a data array of the cache is fetched in response to the load operation.

4. The method of claim 1, wherein replacement of an entry in the translation lookaside buffer includes searching all entries in the translation lookaside buffer for aliasing and invalidating any aliased entries in the translation lookaside buffer.

5. The method of claim 2, wherein replacement of an entry in the translation lookaside buffer is delayed until the entry to be replaced does not exist in the store buffer.

6. The method of claim 2, wherein invalidation of an entry in the translation lookaside buffer is delayed until the entry to be invalidated does not exist in the store buffer.

7. The method of claim 3, wherein replacement of an entry in the translation lookaside buffer invalidates all matched entries in the tag array of the cache.

8. The method of claim 3, wherein invalidation of an entry in the translation lookaside buffer invalidates all matched entries in the tag array of the cache.

9. The method of claim 3, wherein the cache includes a second tag array with physical addresses for snooping and translated physical addresses that are not in the translation lookaside buffer.

10. The method of claim 9, wherein an aliased entry in the cache is restored to a new entry in the translation lookaside buffer by a hit in the second tag array.

11. A data processing system, comprising:
a memory; and
a processor coupled to the memory, wherein the processor is configured to translate, using an associated translation lookaside buffer, a first virtual address into a first physical address through a first entry number, associated with a first multi-bit translation lookaside buffer way and a first multi-bit translation lookaside buffer index, in the translation lookaside buffer, translate, using the translation lookaside buffer, a second virtual address into a second physical address through a second entry number, associated with a second multi-bit translation lookaside buffer way and a second multi-bit translation lookaside buffer index, in the translation lookaside buffer and, determine that the first and second virtual addresses point to the same physical address in memory and reference the same data via a determination the first multi-bit translation lookaside buffer way is equal to the second multi-bit translation lookaside buffer way and the first multi-bit translation lookaside buffer index is equal to the second multi-bit translation lookaside buffer index.

12. The data processing system of claim 11, wherein the first entry number is associated with a first address in a first content-addressable memory that is included in a store buffer and the second virtual address is associated with a load operation, and wherein store data in the store buffer is forwarded to the load operation.

13. The data processing system of claim 11, wherein the first entry number is associated with a first address that is included in a first tag array of a cache and the second virtual address is associated with a load operation, and wherein store data in a data array of the cache is fetched in response to the load operation.

14. The data processing system of claim 11, wherein replacement of an entry in the translation lookaside buffer includes searching all entries in the translation lookaside buffer for aliasing and invalidating any aliased entries in the translation lookaside buffer.

15. The data processing system of claim 12, wherein replacement of an entry in the translation lookaside buffer is delayed until the entry to be replaced does not exist in the store buffer.

16. The data processing system of claim 12, wherein invalidation of an entry in the translation lookaside buffer is delayed until the entry to be invalidated does not exist in the store buffer.

17. The data processing system of claim 13, wherein replacement of an entry in the translation lookaside buffer invalidates all matched entries in the tag array of the cache.

18. The data processing system of claim 13, wherein invalidation of an entry in the translation lookaside buffer invalidates all matched entries in the tag array of the cache.

19. The data processing system of claim 13, wherein the cache includes a second tag array with physical addresses for snooping and translated physical addresses that are not in the translation lookaside buffer.

20. The data processing system of claim 19, wherein an aliased entry in the cache is restored to a new entry in the translation lookaside buffer by a hit in the second tag array.

21. A processor, comprising:
a cache memory; and
a processor core coupled to the cache memory, wherein the processor core is configured to translate a first virtual address into a first physical address through a first entry number, associated with a first multi-bit translation lookaside buffer way and a first multi-bit translation lookaside buffer index, in a translation lookaside buffer, translate a second virtual address into a second physical address through a second entry number, associated with a second multi-bit translation lookaside buffer way and a second multi-bit translation lookaside buffer index, in the translation lookaside buffer, and in response to the first entry number being the same as the second entry number as determined by the first multi-bit translation lookaside buffer way being equal to the second multi-bit translation lookaside buffer way and the first multi-bit translation lookaside buffer index being equal to the second multi-bit translation lookaside buffer index, provide data to a load operation associated with the second virtual address.

* * * * *